UNITED STATES PATENT OFFICE.

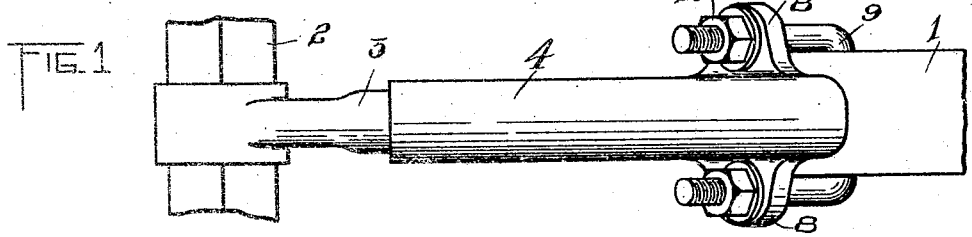
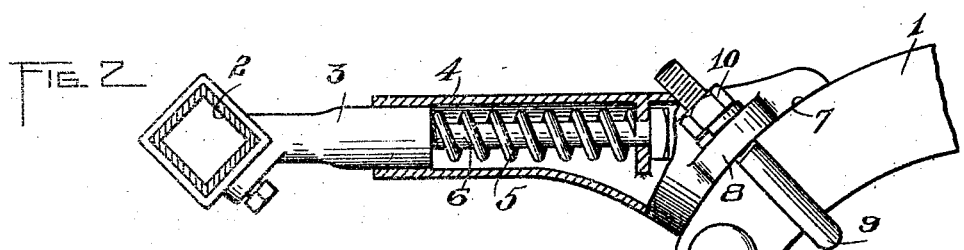
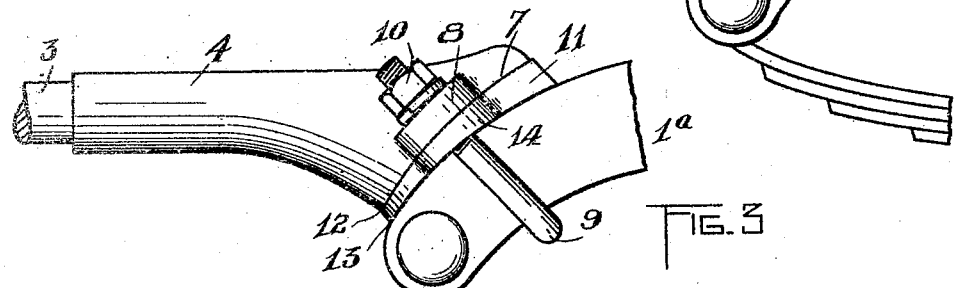
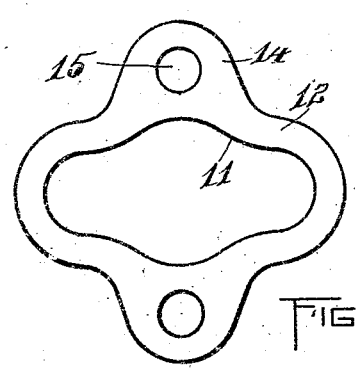

JAMES H. SAGER, OF ROCHESTER, NEW YORK, ASSIGNOR TO J. H. SAGER COMPANY, OF ROCHESTER, NEW YORK, A CORPORATION.

BUMPER.

1,348,961.  Specification of Letters Patent.  Patented Aug. 10, 1920.

Application filed May 29, 1920. Serial No. 385,112.

*To all whom it may concern:*

Be it known that I, JAMES H. SAGER, a citizen of the United States, and resident of Rochester, in the county of Monroe and State of New York, have invented certain new and useful Improvements in Bumpers, of which the following is a specification.

The present invention relates to bumpers and more particularly to the type adapted to be secured to the frames of vehicles such as automobiles, an object of this invention being to provide a construction in which adapting members are associated with the bumper supporting arms for the purpose of adapting said arms to the curved ends of different vehicle frames. Another object of the invention is to provide an adapting member which is reversible in order to fit either of two differently shaped frame bars. Still another object of the invention is to provide for effectively securing an adapting member between a bumper supporting arm and a vehicle frame bar.

To these and other ends, the invention consists of certain parts and combinations of parts, all of which will be hereinafter described, the novel features being pointed out in the appended claim.

In the drawings:

Figure 1 is a plan view of a bumper supporting arm attached to a frame bar of an automobile;

Fig. 2 is a side view partially in section of a bumper supporting arm attached to a vehicle frame bar;

Fig. 3 is a fragmentary view of a bumper supporting arm showing the adapting member in one position interposed between the bumper supporting arm and the vehicle frame bar;

Fig. 4 is a view similar to Fig. 3 showing the adapting member in its other position between the bumper supporting arm and the vehicle frame bar;

Fig. 5 is a plan view of the adapting member; and

Fig. 6 is a sectional view through the adapting member.

Referring more particularly to the drawings, 1 indicates the curved forward end of one of the frame bars of an automobile to which one of the supporting arms of the bumper is shown secured. The bumper as usual comprises two supporting arms connected by a bumper bar 2 of any suitable construction. The supporting arms in this instance each embody an outer member 3 secured to the bumper bar and an inner member 4, the outer member being telescoping within the inner member and a spring 5 being arranged about a bolt 6 within the inner member and holding the outer member yieldingly in proper position. The inner end of the inner member 4 is provided with a curved abutting surface 7 adapted to bear against and to conform to the curved end of the vehicle frame bar 1.

In order to secure the bumper supporting arm to the vehicle frame bar, it is preferred to provide the vehicle supporting bar on opposite sides with laterally extending lugs 8, the rear faces of these lugs being flush with the curved rear end of the bumper supporting arm. These lugs are preferably midway between the upper and the lower edges of the curved surface 7 and they are perforated to receive the arms of a U shaped clip 9 which is passed about the frame bar 1 and has nuts 10 operating on its arms for the purpose of drawing the clip firmly about the frame bar 1, and the curved abutting surface 7 firmly against the frame bar.

Associated with each bumper supporting arm is an adapting member 11, this adapting member having two curved surfaces 12 and 13, the curved surface 12 conforming to the curved abutting surface 7 on the inner end of the bumper supporting arm and the curved surface 13 being adapted to engage a curved end of a vehicle frame bar different from the curve of the bar 1. The two surfaces 12 and 13 are so arranged with reference to each other that the washer or adapting member gradually increases in thickness from one side thereof to the opposite side. The purpose of this arrangement is to permit the adapting member when in one position in engagement with the curved abutting surface 7 as indicated in Fig. 3 to conform to the curved end 1$^a$ of a vehicle frame bar of less steepness than the bar 1 so that the supporting arm of the bumper may be positioned horizontally or, when the adapting member is reversed, as shown in Fig. 4, to conform to the curved end 1$^b$ of a frame bar of steeper curvature than the frame bar 1 so that the bumper supporting arm may lie in a horizontal position. The adapting washer is preferably provided on opposite sides with perforated lugs 14, the openings 15 of said lugs being adapted to receive the arms of the U-shaped clip 9 in order that said clip may also be utilized for securing the adapting washer or member. The lugs 14 are symmetrically arranged with reference to the opposite sides of the washer so that the washer will be substantially flush with the end of the bumper supporting arm in either position of said washer.

From the foregoing it will be seen that there has been provided a bumper supporting arm which has a curved abutting end adapted to directly bear against a vehicle frame bar or to coöperate with an adapting washer so that the frame bars of other curvatures may be engaged. This adapting washer is reversible and it is held in position by the fastening means which secures the bumper supporting means to the vehicle frame.

What I claim as my invention and desire to secure by Letters Patent is:

1. A bumper provided with a supporting arm having an end curved to conform to the curved end of a vehicle frame bar, an adapting member having a face curved to conform to the curved end of the supporting arm and a face curved to conform to the curved end of another vehicle frame bar, the two curved faces of the adapting member being so arranged with reference to each other that the adapting member increases in width from one side thereof to the opposite sides.

2. A bumper provided with a supporting arm having an end formed to fit a vehicle frame bar, and an adapting member having a face formed to fit the end of the bumper supporting arm and a face formed to coöperate with the curved end of another vehicle frame bar.

3. A bumper provided with a supporting arm having an end adapted to coöperate with a vehicle frame bar, an adapting member having a face to conform to the end of the bumper supporting arm and a face adapted to coöperate with the curved end of another vehicle frame bar, the supporting arm and the adapting member having registering openings, and fastenng means passing through said registering openings to secure the supporting arm and the adapting member to a vehicle frame bar.

4. A bumper provided with a supporting arm having an end curved to conform to the curved end of a vehicle frame bar and provided with lugs on opposite sides thereof formed with openings, an adapting member having a face to conform to the curved end of the supporting arm and a face curved to conform to the curved end of another vehicle frame bar, said adapting member having lugs on opposite sides formed with openings registering with the openings in the lugs of the supporting arm, and fastening means passing through the registering openings to secure the supporting arm and the adapting member to a vehicle frame bar.

5. A bumper provided with a supporting arm having an end formed to coöperate with the curved end of a vehicle frame bar, and a reversible adapting member having a face conforming to the end of the bumper supporting arm in either position of the adapting member, said adapting member also having a face adapted to coöperate with a vehicle frame bar in either position of the adapting member.

6. A bumper provided with a supporting arm having a curved end to conform to the curved end of a vehicle frame bar, said supporting arm also having lugs on opposides formed with openings, a reversible adapting member having a face curved to conform to the curved end of the supporting arm and a face curved to conform to the curved end of another vehicle frame bar, said adapting member having lugs on opposite sides provided with openings adapted to register with the openings in the lugs on the supporting arm in either position of the adapting member, and fastening means passing through the registering openings in the supporting arm and the adapting member to hold the supporting arm and the adapting member to a vehicle frame bar.

JAMES H. SAGER.